Feb. 26, 1935.  A. A. GABRIELSON  1,992,203
GARDEN HOSE HOLDER
Filed July 17, 1933

INVENTOR
ARTHUR A. GABRIELSON
BY
ATTORNEY

Patented Feb. 26, 1935

1,992,203

UNITED STATES PATENT OFFICE 1,992,203

GARDEN HOSE HOLDER

Arthur A. Gabrielson, Minneapolis, Minn.

Application July 17, 1933, Serial No. 680,771

5 Claims. (Cl. 248—28)

This invention relates to a device for holding an object of cylindrical or like form, such as a garden hose. As is well known, a garden hose is now used a great deal to sprinkle lawns and flower beds and it is often desirable to have the hose held so the nozzle points in a certain direction in order to direct the water upon the desired spot.

It is an object of this invention to provide a device for holding a garden hose or like object which is of extremely simple construction and which is easily operated and very efficient.

It is another object of this invention to provide a hose holder or similar device made of wires or rods having intermediate portions formed to embrace the hose, said wires or rods being connected to swing about a common axis and having their end portions bent and constructed and arranged to engage the ground and hold said device in the desired position.

It is a further object of this invention to provide a device for holding a hose or similar object comprising a pair of members having intermediate portions of partly circular form, said members being connected to swing about a common axis with said partly circular portions in opposing relation and adapted to embrace the hose, the ends of said members being bent into substantially parallel relation and arranged to be inserted in the ground.

It is more specifically an object of this invention to provide a device for holding a hose or similar object comprising a pair of members in the form of wires or rods having intermediate portions of partly circular form and oppositely disposed respectively on said members, said members having straight portions at either end of said partly circular portions, one of said members being coiled about the other at said latter straight portions so that said members are hingedly connected, the ends of said members being bent to extend in substantially parallel relation and having their ends sharpened so as to be thrust into the ground.

These and other objects and advantages of the invention will be fully set forth in the following description made in connection with the accompanying drawing, in which like reference characters refer to similar parts throughout the several views and in which:—

Figure 1:
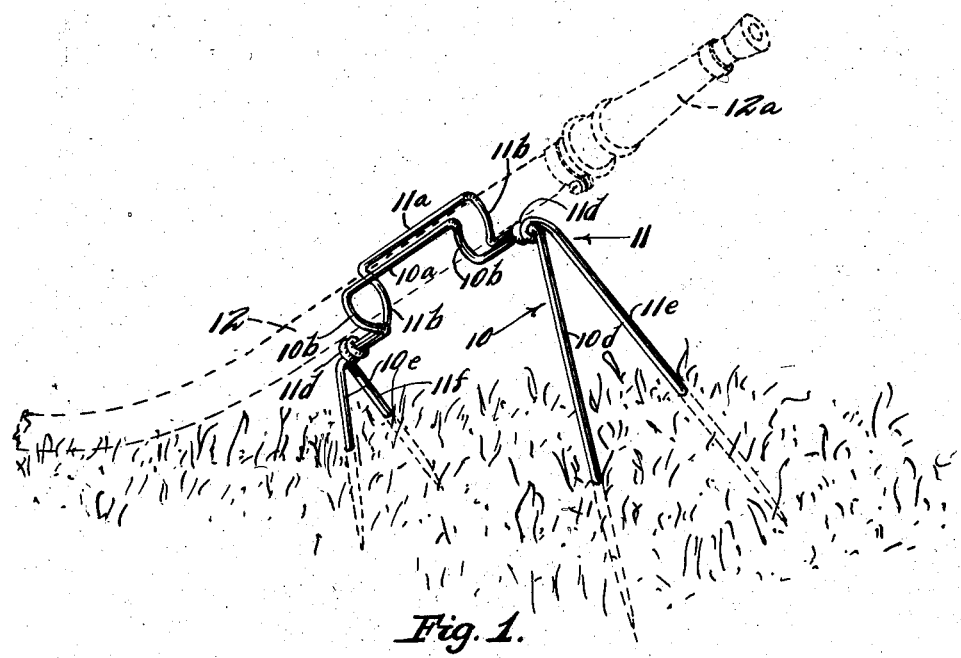
Fig. 1 is a perspective view of the device showing the same in operative position with a hose held therein and indicated in dotted lines.
Figure 2:
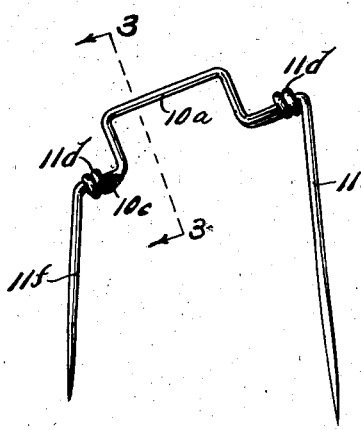
Fig. 2 is a view in side elevation of the device.
Figure 3:
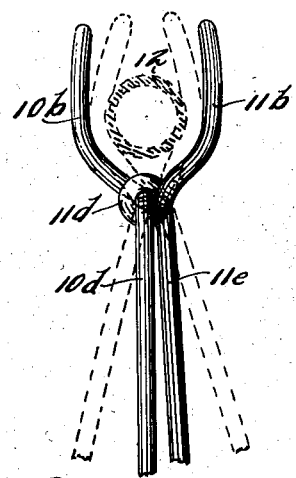
Fig. 3 is a partial view in end elevation shown on an enlarged scale, a hose and the device in a different position being indicated in dotted lines.
Figure 4:
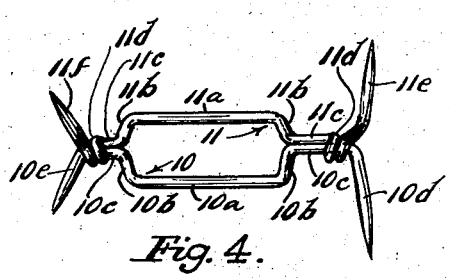
Fig. 4 is a plan view of the device.

Referring to the drawing, a device is shown comprising a pair of members 10 and 11 and while these might be variously formed, in the embodiment of the invention illustrated, they are shown as made of small rods or wires, said members 10 and 11 have portions 10a and 11a intermediate their ends which are shown as straight and in the assembly of the device are substantially parallel. Each member 10 and 11 has partly circular portions 10b and 11b disposed respectively at the ends of portions 10a and 11a and disposed in planes substantially at right angles to portions 10a and 11a. Beyond portions 10b and 11b, members 10 and 11 have other straight portions 10c and 11c, portions 10c being longitudinally alined and portions 11c being longitudinally alined. Member 11 has portions 11d which are coiled about or wrapped around the portions 10c, respectively. Members 10 and 11 are thus hingedly connected to swing about the axis of members 10c. It will be noted, as stated, that the partly circular portions 10b and 11b, which are oppositely disposed with their concave sides adjacent, are thus swingable about said axis toward and from each other. Member 11 beyond the portions 11d is bent so that its ends extend substantially parallel or in slightly diverging relation, one end 11e being somewhat longer than the opposite end 11f. Member 10 has its end portions 10d and 10e bent at nearly a right angle to portions 10c and extending in substantially parallel or slightly diverging relation, end portion 10d being somewhat longer than portion 10e. The ends of members 11e, 11f, 10d and 10e are sharpened so as to be easily thrust into the ground.

In operation when it is desired to hold the hose shown as 12 in Fig. 1 to have the nozzle 12a point in a certain direction, members 10 and 11 will be swung relatively to each other so that portions 10a and 11a separate. The hose 12 can now be placed between portions 10a and 11a extending longitudinally thereof and members 10 and 11 will now be swung to move end portions 11e and 10d apart. This causes portions 10b and 11b to embrace and clasp the hose 12. With the parts in this position the ends 11e, 11f, 10d and 10e can be engaged firmly with the ground or the ends thereof thrust into the ground as shown in Fig. 1 and hose 12 will thus be held firmly grasped. The desired inclination can be given to the hose by thrusting the ends of the device further into the ground at either end thereof.

From the above description it will be seen that applicant has provided a very simple and yet very efficient and easily operated device for holding a garden hose or other cylindrical article. The device is very easily and inexpensively made and preferably will be made out of plated iron or steel wires so it will be rustproof. By engaging the ends of the device firmly with the ground, the device is held in position firmly grasping the hose so that it will not move out of the desired position. The device has been amply demonstrated in actual practice and has been found to be very successful and efficient.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:—

1. A hose holder having in combination, a pair of members of rod or wirelike formation, each formed to have hose embracing portions at their intermediate parts and having substantially straight longitudinally alined portions at each side of said portions, one of said members being wrapped about the other at said straight portions so that said members are swingably connected and said first mentioned portions may swing toward and from each other, the ends of said members being bent at nearly a right angle to said straight portions and adapted to engage the ground.

2. A device of the class described comprising a pair of wires or rods having intermediate parallel portions, partly circular portions at each end thereof disposed in planes substantially at right angles to said portions, said wires or rods having other straight portions beyond and at each end of said partly circular portions, one of said wires or rods being coiled about the last mentioned straight portions of the other to connect said members so as to be swingable about the axis of one of said last mentioned straight portions, the ends of said members being bent into substantially parallel relation at an angle to said axis and having their ends sharpened to be pushed into the ground.

3. A device of the class described comprising two members formed of wires or rods connected at spaced points to swing about a common axis, said members being formed into partly circular portions at one side of said axis and between said points so as to embrace a hose or other cylindrical object, said members having their end portions bent to extend at the opposite side of said axis and being constructed and arranged to engage the ground.

4. A device of the class described comprising two members formed of wires or rods connected together to swing about a common axis and formed with intermediate and partly circular portions alined transversely of said axis and oppositely curved to embrace a hose or other cylindrical object, both end portions of each of said members being bent at an angle to said axis to extend in a substantially opposite direction away from said axis as said circular portions and being adapted to engage the ground.

5. A device of the class described comprising a pair of wires or rods having interengaging portions at longitudinally spaced points so that they are swingably connected about a common axis, said wires or rods being respectively formed with curved portions between said points and at one side of said axis, said curved portions being oppositely disposed so that when said wires or rods are swung about said axis they may embrace a cylindrical object, said wires or rods at the other side of said axis extending substantially at right angles to said axis and in the same general direction as said curved portions and having their ends adapted to be thrust into the ground.

ARTHUR A. GABRIELSON.